United States Patent [19]

Kaneko et al.

[11] Patent Number: 4,677,506
[45] Date of Patent: Jun. 30, 1987

[54] TRACKING APPARATUS FOR ROTATIONAL MAGNETIC RECORDING MEDIUM WITH ENVELOPE LEVEL CORRECTION

[75] Inventors: Kiyotaka Kaneko; Katsuo Nakadai; Izumi Miyake; Kazuya Oda, all of Kaisei, Japan

[73] Assignee: Fuji Photo Film Co., Ltd., Kanagawa, Japan

[21] Appl. No.: 840,756

[22] Filed: Mar. 18, 1986

[30] Foreign Application Priority Data

Mar. 20, 1985 [JP] Japan ................................. 60-54352

[51] Int. Cl.⁴ ............................................. G11B 5/56
[52] U.S. Cl. .................................................. 360/77
[58] Field of Search ................................. 360/77, 78

[56] References Cited

U.S. PATENT DOCUMENTS

4,344,165 8/1982 Akiyama ................................. 360/77
4,544,964 10/1985 Burns et al. ............................ 360/51

*Primary Examiner*—George G. Stellar
*Attorney, Agent, or Firm*—Birch, Stewart, Kolasch & Birch

[57] ABSTRACT

A tracking apparatus for a signal reproducing apparatus makes use of a rotating magnetic recording medium, especially when such apparatus reproduces information signals recorded on the medium, such as video signals. The tracking apparatus includes a compensation circuit capable of compensating for the envelope level of the signals sensed by the playback head, so that the dynamic range for which the envelope signal is quantized may be narrower, or the quantum level steps may be smaller, and hence the resolution thereof may be enhanced correspondingly.

5 Claims, 7 Drawing Figures

TRACKING APPARATUS FOR ROTATIONAL MAGNETIC RECORDING MEDIUM WITH ENVELOPE LEVEL CORRECTION

BACKGROUND OF THE INVENTION

1. Field of the Invention

The present invention relates to a tracking apparatus for a playback apparatus which makes use of a rotational magnetic recording medium, especially when such apparatus is designed to reproduce information signals such as video signals previously recorded on the rotational magnetic recording medium such as magnetic disk.

2. Description of the Prior Art

There has recently been evolved an electronic still camera system which includes an imager such as a solid-state imager or image pickup tube, combined with a magnetic disk of a larger storage capacity functioning as an inexpensive recording medium to electronically shoot a still image of an object on the recording disk, so that the recorded image is reproduced on a separate television system or printer.

The rotational magnetic recording medium used in such an electronic still camera system is a disk with a diameter of about 50 millimeters on which are recorded 50 tracks with a track about equal to 100 µm, that is, with a track width about equal to 50 to 60 µm and a guard band width about equal to 50 to 40 µm. In the recording or reproducing apparatus, the magnetic disk is revolved at a constant speed of e.g. 3,600 r.p.m. to effect a recording or playback of a field or frame of video signals.

The recording medium employed in such magnetic recording is susceptible to tracking error due to compatibility, offset or center deviation, heat expansion or the like with the result that the magnetic reproducing or playback head is apt to sweep the track next to the desired one, thus causing crosstalk.

In order to avoid such a problem, there is also known a system into which the recording head is subjected to a tracking servo to record tracking signals, and the reproducing head is subjected to a tracking servo by making use of these tracking signals. However, it would not be practically advisable to provide the small lightweight recording device such as camera with a tracking servo system which requires a precision control.

There is also known a method wherein the guard band system or an FM azymuth system is used as a recording scheme, and wherein a small amount of tracking error during reproduction is compensated by the arrangement in which the reproducing head is prevented from running on adjacent tracks or, if it does, it is prevented from picking up the signals of these adjacent tracks.

There is also known an envelope peak detecting auto-tracking control system wherein the recording head is transferred by a stepping motor at a predetermined track pitch without tracking servo, and wherein the reproducing head senses the envelope of the output signals of a track to identify the optimum track on the basis of the peak envelope so as to be subjected to a tracking servo.

For determining the head position at which the envelope shows its peak value, the head is shifted to a predetermined pitch position where the envelope is sensed to be compared to the envelope value obtained at the preceding head position.

For effecting such comparison, a digital processing system is generally used. To this end, the video signals sensed by the magnetic head is envelope detected and the resulting envelope output signal is converted by an analog to digital converter into digital signals, are in turn supplied to a digital processing system. To exclude detection error due to system disturbances, such as noises, only the envelope level in excess of a preset threshold value is advantageously used for such comparison. The dynamic range of the analog to digital converter should be designed so that the envelope level in excess of the preset threshold value is converted, with sufficient resolution, into corresponding digital signals.

With the rotating magnetic recording medium such as magnetic disk steadily revolving at a predetermined r.p.m., the envelope level of the sensed and detected frequency signals is lower for the radially inner track than for the radially outer track, since the radially inner track shows a slower linear speed relative to the head than the radially outer track. In general, for the same frequency range of the frequency signals recorded on the tracks, the envelope level depends on the contact state between the head and the track, the linear speed of the track relative to the head, and the track radius, with the latter being more decisive than the former three factors. Therefore, macroscopically, the envelope output level is lowered in reverse proportion to the track radius. For this reason, the dynamic range of the analog to digital converters is designed by taking the innermost track of the recording medium into account as a reference track.

However, the so-designed analog to digital converters present the problem that the envelope signals derived from the tracks closer to the radially outermost track account for a majority of the dynamic range of the analog to digital converter, whereas the signals derived from the tracks closer to the radially innermost track account for only a minor portion of the dynamic range. This means that the resolution of the envelope signal is sufficiently high with the former tracks, but insufficient with the latter tracks.

More specifically, when the head is shifted with the predetermined pitch as mentioned hereinabove for detecting the envelope peak position, the envelope data converted into the digital value shows different quantum level steps and significant changes in the case of the radially outer tracks, as the head is shifted radially, so that the peak position may be determined positively. In the case of the radially inner tracks, the envelope data is not changed significantly, but shows a rather flat pattern, thus occasionally making it difficult to identify its peak position, or to accomplish tracking with high accuracy.

SUMMARY OF THE INVENTION

It is therefore an object of the present invention to overcome the above-mentioned deficiencies of the prior art, and to provide a tracking apparatus for a rotational magnetic recording medium which is simpler in design and yet enables tracking to be effected with higher accuracy irrespective of the occasional head position.

The present invention provides a tracking apparatus for a rotational magnetic recording medium comprising a playback head designed to sense signals from a plurality of tracks formed on the rotational recording medium each with a trajectory in which recording start and terminal ends of each track coincide with each other, said recording medium being steadily revolved at a predetermined revolving rate; head shifting means for movably supporting said playback head over said recording medium; envelope detection means for detecting the envelope of the signals sensed by the playback head; and control means for controlling said head shifting means to cause said playback head to be shifted to desired one of said tracks on the basis of the first signal to effect tracking. The control means is operable to produce a second signal in response to said shifting means, said second signal indicating the position of said playback head on said magnetic recording medium. Said tracking apparatus includes compensation means for compensating in level for the sensed envelope signal in accordance with said second signal to produce said first signal. Said compensation means is operable to make compensation in such a manner as to form said first signal of a higher level when said second signal indicates that the playback head is positioned on a track of a shorter radius than when the head is positioned on a track of a larger radius.

In the specification, a track in which "the recording start and terminal ends coincide with each other" means that a track can be completed without changing the relative position of the magnetic head with respect to the recording medium. Thus, a number of concentric tracks about the rotational axis as center in the case of a magnetic disk, and a number of parallel circumferential tracks in the case of a magnetic drum may be given as examples.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

In the accompanying drawings, there are shown drawings of two preferred embodiments of the tracking apparatus for the rotary magnetic recording medium in accordance with the present invention.

Figure 1:
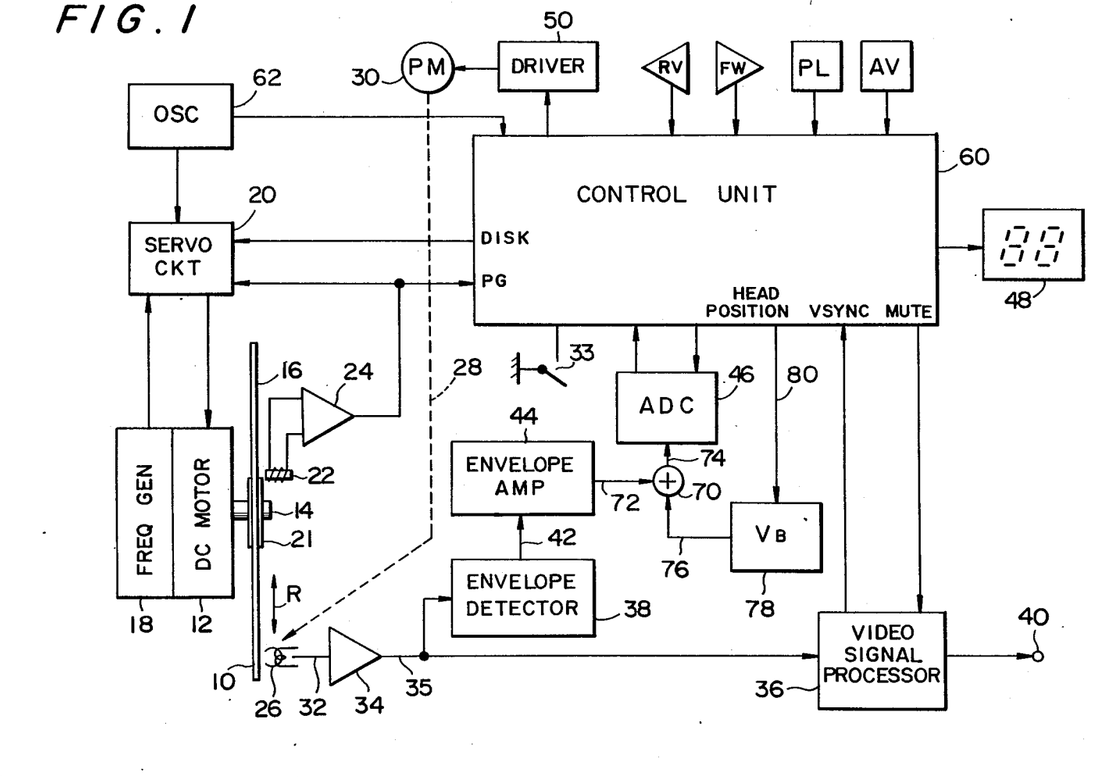
FIG. 1 is a schematic block diagram showing an embodiment of a tracking apparatus in accordance with the present invention.

In the first embodiment of the tracking apparatus, shown in FIG. 1, a rotary recording medium 10 such as magnetic disk is detachably affixed to a spindle 14, which may be driven by a d.c. electric motor 12. In the present embodiment, the magnetic disk 10 may be about 50 millimeters across and formed of a magnetic recording material. On the recording surface 16 of the disk 10, a plurality of, e.g. fifty, recording tracks are concentrically recorded at the pitch of e.g. ca. 100 μm. In the present embodiment, the signals recorded on these tracks may be video signals, for example, color video signals formed by frequency modulated brightness and chromatic signals. These video signals are recorded, for example, in the form of a field of video signals on a track, which will in turn reproduce an image field upon raster scanning.

The d.c. motor 12 has a frequency generator 18 for producing a.c. frequency signals. It is supplied with power from a servo circuit 20 to be servo controlled so that the disk 10 will be rotated at a predetermined constant speed of, for example, 3,600 r.p.m. The servo circuit 20 is connected to a control circuit 60 designed to control the overall tracking apparatus so that the circuit 20 will control the rotational driving and stop of the disk 10 responsive to the signal DISK.

A phase generator 22 is arranged in position in the vicinity of the recording surface 16 of the disk 10, and connected via amplifier 24 to the servo circuit 20 and to the control unit 60. By the operation of the phase generator 22, the timing mark arranged at a predetermined angular position of a core 21 of the disk 10 are sensed for producing timing pulses PG.

A magnetic transducer or magnetic head 26 is provided above the recording surface 16 and carried by a supporting system 28. As indicated by the dotted line in FIG. 1, the system 28 is driven by a stepping motor (PM) 30 for shifting the head 26 across the recording surface 16 in both radial directions for selecting a desired one of the tracks on the surface 16.

Although the magnetic head 26 may be provided with a magnetic recording function, it is illustratively designed as an example to reproduce the video signals, i.e. to pick up video signals from the tracks already recorded on the surface 16 for conversion thereof into associated electrical signals. In the present example, since the disk 10 rotates at the constant speed of 3,600 r.p.m., as mentioned hereinabove, one-track of video signals, that is, one-field of FM video signals, is reproduced from the head 26 per each disk revolution, or each one-sixtieth of a second. When subjected to frequency demodulation, these signals are converted into an analog format compatible with the standard color television system, such as NTSC system.

The reproducing output 32 of the magnetic head 26 is connected via preamplifier 34 to a video signal processing circuit 36 and an envelope detection circuit 38. The processing circuit 36 is designed to process the video signals sensed by the magnetic head 26 into composite color video signals of the NTSC format, for example, which are then supplied at an output 40. The circuit 36 is also designed to extract vertical sync signals VSYNC from the demodulated composite color video signals to supply them to the control unit 60. It is also designed to receive signals MUTE from the control circuit 60 to carry out muting, that is, to blank out an effective horizontal scanning period of video signals. It will be noted however that such function of the conversion into the standard format is not indispensable to the present apparatus. That is, the apparatus may be simply endowed with the function of extracting sync signals from the video signals sensed by the magnetic head 26 to produce these sync signals at the output 40 under the operation of the control unit 60.

The envelope detection circuit 38 is designed to detect in envelope the FM video signals recorded on a track on the surface 16 to produce an associated output from the output 42. The circuit 38 is connected via envelope amplifier 44 to one input 72 of a summation circuit 70. To the other input 76 of the circuit 70 is coupled an output from a control voltage generator 78. The circuit 70 is designed to add the voltage signals at the inputs 72 and 76 together, and has its output 74 connected to an analog to digital converter (ADC) 46. The control voltage generator 78 is designed to receive from the control unit 60 on a data line 80 digital data indicative of the occasional radial position of the magnetic head 26 to develop a variable analog voltage or control voltage VB at an output 76 as a function of the digital data.

The ADC 46 has 256 quantum level steps in the present example, and is designed to convert the envelope level signals at the input 74 into a series of 8-bit data and to produce these data whenever a request is made by the control unit 60.

As will be described later, the control unit 60 is designed to supervise the control of the overall apparatus in dependence upon the user's commands, and may preferably be implemented by, for example, a microprocessor system.

To the control circuit 60 are also connected, in the present example, a playback key PL for instructing the start and stop of the reproducing apparatus, a forward key FW for instructing shifting of the head 26 in the forward direction of the track number, for example, from an outer track towards an inner track, and a reverse key RV for instructing shifting of the head 26 in the reverse direction. The track numbers instructed by the keys FW or RV are visually displayed at a display 48, such as LEDs or CRT, connected to the control unit 60. Audible display may also be used to produce audible alarms.

The stepping motor 30 is a four-phase pulse-responsive motor, and adapted to be turned by a step of ca. 15 angular degrees responsive to one driving pulse. Therefore, it performs a full revolution every 24 pulses. The head supporting unit 28 is designed to shift the magnetic head 26 ca. 4.2 μm in response to each pulse in the direction of the arrow R. The excitation period of time for each pulse is ca. 2 to 3 milliseconds, for example. Hence, the head 26 is shifted ca. 100 μm with 24 pulses.

These driving pulses are supplied from a driving circuit 50 comprised of a current amplifier. The circuit 50 generates driving pulses for the excitation coil windings of the stepping motor 30 in accordance with the excitation patterns commanded by the control unit 60.

The control unit 60 and the servo circuit 20 are responsive to the reference clock signals produced by a reference generator (OSC) 62. In the present example, 60 Hz reference signals, that is, signals of the same frequency as the field frequency of the raster scanning video signals recorded on the disk 10, are supplied to the servo circuit 20, whereas faster clock signals, for example, 3.58 MHz clocks, are supplied to the control unit 60.

Control is made in accordance with an envelope peak detecting autotracking control fashion as discussed below. It is assumed that the magnetic head 26 is already on a certain track. Upon actuation of the key FW or RV, the control circuit 60 starts the stepping motor 30 by the driving circuit 50 for shifting the head 26 in the forward or reverse direction.

In the present example, the magnetic head 26 is shifted a distance slightly shorter than the track pitch of 100 μm, for example, a distance equal to ca. 96 μm corresponding to 23 pulses, in the forward or reverse direction. The signals read out by the magnetic head 26 are detected by the circuit 38 so as to be introduced via summation circuit 70 and ADC 46 into the control unit 60 in the form of digital data, step 200, FIG. 3. For sake of convenience, it is assumed herein that the voltage level of the other input 76 of the circuit 70 remains constant. The control unit 60 then checks to see if the read out envelope value is higher than the predetermined threshold value, step 202, and otherwise causes the head 26 to be shifted further by one pulse in the same direction, step 206.

Figure 3:
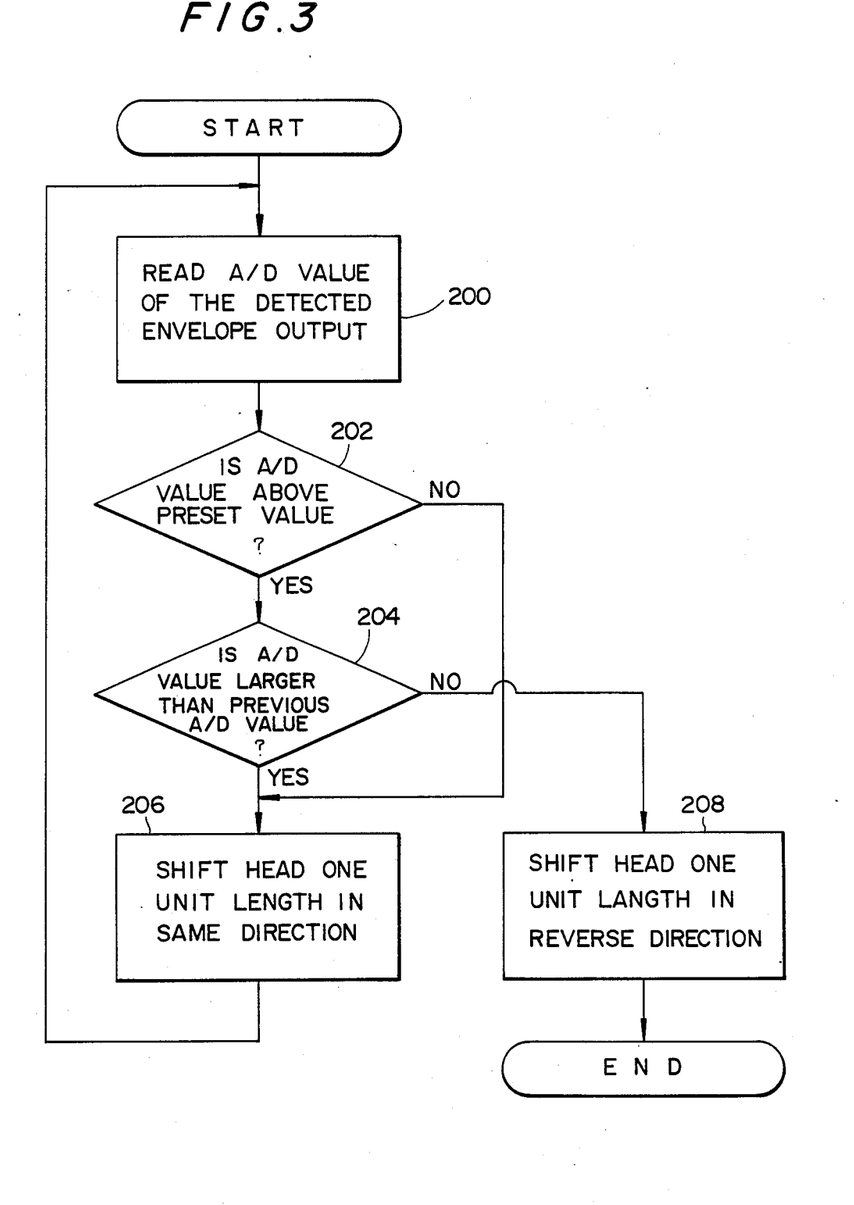
FIG. 3 is a flow chart showing an example of the operational sequence executed in the control units shown in FIGS. 1 and 2.

When the read envelope value is higher than the preset threshold Vth, level is compared to that of the envelope value read out at the preceding head position, step 204. If the present value is larger than the preceding one, the head 26 is shifted further by one pulse in the same direction, step 206. This sequence of operations is repeated. If the present value is not larger than the preceding one, the head 26 is shifted by one pulse in the reverse direction, step 208, to complete the tracking.

In this manner, the control unit 60 operates to sense and compare the envelope levels during the transfer of the head 26 to determine the peak envelope position. The head position associated with the detected envelope peak is the correct on-track position, that is, the position that the head 26 is correctly aligned with the desired track. In this manner, control unit 60 accomplishes the envelope peak detect autotracking control.

In the vicinity of the home or reset position of the magnetic head 26, there is provided a switch 33 that is actuated when the magnetic head 26 is in the vicinity of the switch. The reset position is set to be in the outermost track or further outward thereof. The switch 33 is connected to the control unit 60. The unit 60 performs the driving control of the stepping motor 30 through the driving circuit 50 and, as it determines when the head 26 is returned to its original or reset position, is able to count the current head position on the basis of the two relevant information signals.

Figure 6:
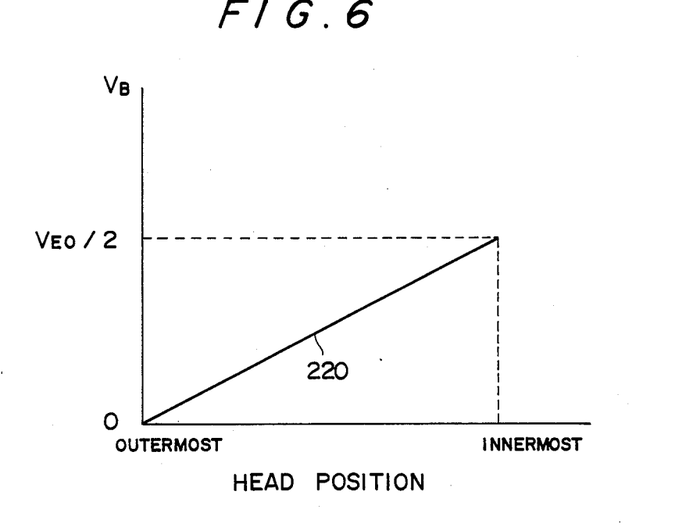
FIGS. 6 and 7 plot typical input and output characteristics of the control voltage generating circuits employed in the embodiments shown in FIGS. 1 and 2.

The head position data indicative of the current position of the magnetic head 26 is supplied over data line 80 to the control voltage generator 78, which generates the analog control voltage VB indicated by a straight line 220 in FIG. 6. The control voltage VB in the present example is zero when the head 26 is at the outermost track of the disk 10. When the head 26 is positioned at the innermost track of the disk 10, the voltage VB is equal to about one half the envelope level VEO obtained at this time at the magnetic head 26. Between these extreme positions, the control voltage VB is changed linearly. The circuit 78 may be provided with means for variably adjusting the gradient K of the straight line 220.

Figure 4:
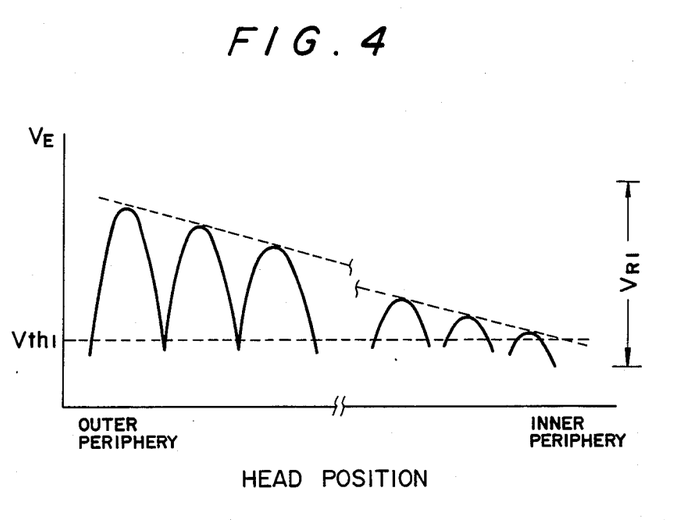
FIG. 4 is a graph showing changes relative to the head position of the envelope signals developed from the envelope amplifiers in the embodiments of FIGS. 1 and 2.

The envelope level VE supplied from the envelope amplifier 44 to one input 72 of the signal adder 70 is changed as shown in FIG. 4 responsive to changes in the position of the magnetic head 26. That is, the envelope level VE shows local peak values for the respective tracks as the head 26 is shifted from the outermost towards the inner tracks, these peak levels decreasing linearly from the outer towards the inner peripheries. Therefore it is easily understood that, should the apparatus be designed to feed the output 72 of the envelope amplifier 44 directly to the ADC 46, then the dynamic range VR1 of the ADC 46 with respect to the envelope signal derived from the inner tracks could be utilized more incompletely than that with respect to the envelope signals derived from the outer track, with the result that the resolution of the quantized digital output would associatedly be lowered.

In the present example, the envelope signal VE at the output 72 of the amplifier 44 is summed to the control voltage VB of the other input at the summation circuit 70, and in turn delivered to the input 74 of the ADC 46 in the form of the corrected or augmented envelope signal VE1 (=VE +VB).

Figure 5:
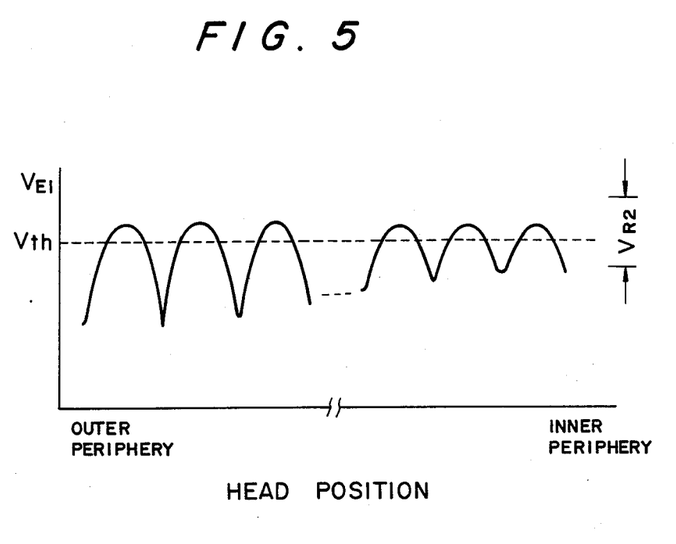
FIG. 5 is a graph, similar to FIG. 4, showing the corrected envelope signals supplied to the analog to digital converters employed in the embodiments shown in FIGS. 1 and 2.

The envelope signals VE1 corrected in this manner are substantially at the same level no matter which radial position of the magnetic disk 10 is occupied by the magnetic head 26. Hence, it is only sufficient if the ADC 46 is designed to quantize with sufficient resolution that envelope level which is in excess of the voltage threshold Vth necessary to be recognized as significant in the control unit 60. In other words, the dynamic range VR2 for quantizing the envelope signal VE1 is notably narrower than the range VR1 described above by referring to FIG. 4. Hence, a simpler design may be used for ADC 46. Conversely, for the same dynamic range, smaller quantum level steps for the higher resolution may be used.

As an example, should the envelope level not be augmented as described hereinabove, 6 bits or 64 quantum level steps are required for quantizing the envelope level with the dynamic range of 4 volts from the minimum to the maximum levels with the resolution of 0.1 volt. Should the envelope level be augmented so that the minimum level is 4 volts, the dynamic range being 1 volt wide, 4 bits or 16 level steps will suffice for the same resolution of 0.1 volt. On the other hand, with the use of the same number of bits or 6 bits, the resolution may be increased to 1/64 volt.

Figure 2:
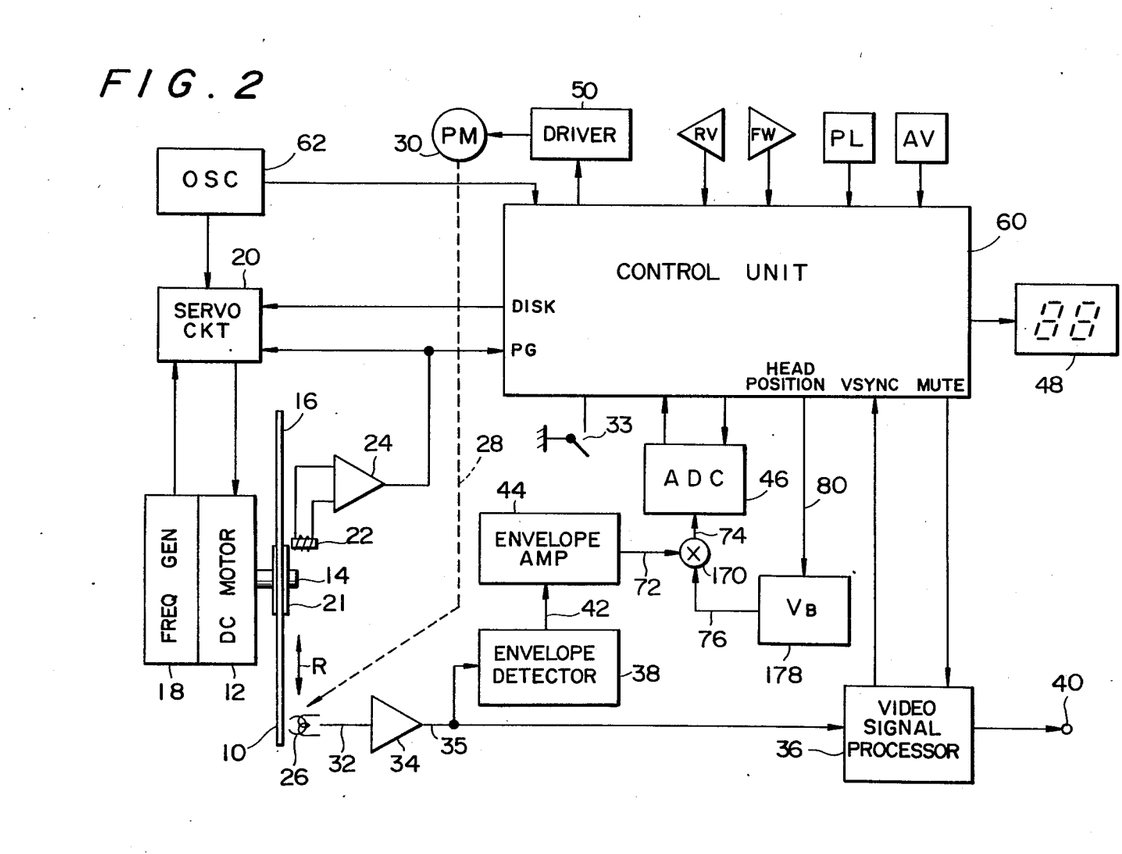
FIG. 2 is a schematic block diagram, similar to FIG. 1, showing an alternative embodiment of the invention.

FIG. 2 shows an alternative embodiment of the tracking apparatus for the rotary magnetic medium. In the present example, the summation circuit 70 and the control voltage generator 78 is the embodiment shown in FIG. 1 are replaced by a multiplier 170 and a control voltage generator 178, respectively. The remaining portions of the apparatus may be similar to those of the first embodiment shown in FIG. 1. Therefore, the constituent elements like those shown in FIG. 1 are denoted by the same reference numerals, and the corresponding description is omitted for simplicity.

Figure 7:
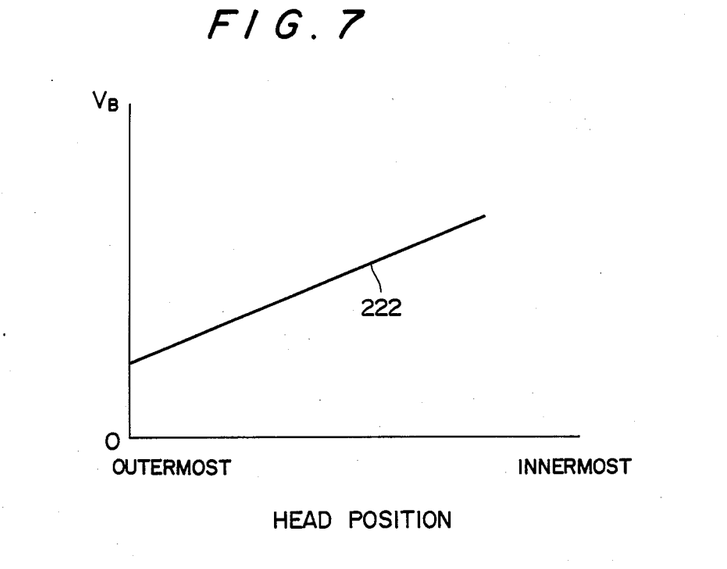

The control voltage generator 178 generates a control voltage VB as indicated by a straight line 222 in FIG. 7. While changing linearly with respect to the current head position, the straight line 222 assumes a value larger than zero at the outermost circumferential position. The control votage VB is produced from the output 76 to the multiplication circuit 170 where it is multiplied by the envelope signal VE supplied from the input 72. Hence, the product of the two signals or the voltage VE1 (=VE×VB) is supplied to the input 74 of the ADC 46. This gives rise to the results similar to those described hereinabove by referring to FIG. 5.

In sum, the overall gain of the amplifier circuit inclusive of the envelope amplifier 44 and the multiplier 170 is variably controlled in response to the control voltage VB supplied from the control voltage generator 178. In this manner, the envelope level derived from the inner track is amplified with a factor higher than that associated with the outer track. The result is the increased voltage level derived from the inner circumferential track and the effect similar to that of the embodiment of FIG. 1.

According to the tracking apparatus for the rotational magnetic recording medium in accordance with the present invention, the envelope level is corrected such that the envelope signal derived from the track with the shorter track radius is emphasized. In this manner, the dynamic range of the analog to digital converter used to quantize the so corrected envelope signal may be narrow so that the ADC of a simpler design suffices. Or conversely, the quantum level steps may be smaller, that is, the resolution of the detection of the envelope level signal peak is correspondingly improved.

In this manner, tracking control can be achieved with sufficient accuracy by a simpler design and without regard to the occasional head positions.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A tracking apparatus for a rotational magnetic recording medium comprising:

a playback head for sensing signals from a plurality of tracks formed on the rotational recording medium, each with a trajectory in which recording start and terminal ends of each track coincide with each other, said recording medium being steadily revolved at a predetermined rate of revolution;

head-shifting means for movably supporting said playback head over said rotational recording medium;

envelope detection means for detecting the envelope of the signals sensed by the playback head; and control means for controlling said head shifting means to cause said playback head to be shifted to desired one of said tracks on the basis of the first signal to effect tracking;

said control means being operable to produce a second signal in response to said head shifting means, said second signal indicating the position of said playback head on said magnetic recording medium;

said tracking apparatus further including compensation means for compensating in level for the sensed envelope signal in accordance with said second signal to produce said first signal;

said compensation means being operable to make compensation in such a manner as to form said first signal of a higher level when said second signal indicates that said playback head is positioned on a track of a shorter radius than when said playback head is positioned on a track of a larger radius.

2. An apparatus according to claim 1, wherein said compensation means includes analog to digital conversion means adapted to supply said first signal to said control means in the form of digital data.

3. An apparatus according to claim 1, wherein
said compensation means includes signal generation means for generating a third signal which increases linearly as said second signal indicates changes in position of said playback head from a larger radius track towards a shorter radius track; and summation circuit means for summing the sensed envelope and said third signal together to produce the first signal.

4. An apparatus according to claim 1, wherein said compensation means includes signal generating means for generating a third signal which increases linearly when said second signal indicates a change in position of said playback head from a larger radius track towards a shorter radius track; and multiplier means for multiplying the sensed envelope by said third signal to produce the first signal.

5. An apparatus according to claim 1, wherein said rotational recording medium includes a magnetic disk.

* * * * *